United States Patent [19]

Müller

[11] 4,066,621

[45] Jan. 3, 1978

[54] CURABLE MIXTURES BASED ON POLYIMIDES OF UNSATURATED DICARBOXYLIC ACIDS AND INDOLE COMPOUNDS

[75] Inventor: Albrecht Müller, Darmstadt, Germany

[73] Assignee: Ciba-Geigy Corporation, Ardsley, N.Y.

[21] Appl. No.: 618,994

[22] Filed: Oct. 2, 1975

[30] Foreign Application Priority Data

Oct. 10, 1974 Switzerland .................... 13625/74

[51] Int. Cl.$^2$ ............................................ C08G 73/12
[52] U.S. Cl. .............................. 260/47 UA; 260/30.2; 260/30.4 N; 260/32.4; 260/32.6 N; 260/33.2 R; 260/33.6 UA; 260/33.8 B; 260/37 N; 260/47 CP; 260/78 TF; 260/78 UA; 428/435; 428/474
[58] Field of Search .............. 260/47 UA, 78 UA, 49, 260/47 CP, 78 TF, 47 P, 63 N; 526/259

[56] References Cited

U.S. PATENT DOCUMENTS

| 3,694,417 | 9/1972 | Rigby et al. ..................... 260/78 UA |
| 3,770,705 | 11/1973 | Akiyama et al. ............... 260/78 UA |
| 3,875,115 | 4/1975 | Balme ............................. 260/47 UA |
| 3,910,859 | 10/1975 | Bargain .......................... 260/47 UA |
| 3,925,314 | 12/1975 | Renner et al. ................. 260/47 UA |
| 3,968,083 | 7/1976 | Quinn .............................. 260/47 CP |

*Primary Examiner*—Lester L. Lee
*Attorney, Agent, or Firm*—Luther A. R. Hall

[57] ABSTRACT

Mixtures which can be cured to give crosslinked copolymerisates having valuable mechanical properties, characterized in that they comprise
a. polyimides of certain unsaturated dicarboxylic acids, such as maleic acid or citraconic acid,
b. indole or indole derivatives and optionally
c. a curing catalyst.

10 Claims, No Drawings

CURABLE MIXTURES BASED ON POLYIMIDES OF UNSATURATED DICARBOXYLIC ACIDS AND INDOLE COMPOUNDS

The present invention relates to new, curable mixtures of polyimides of certain unsaturated dicarboxylic acids and indole and/or indole derivatives, and to processes for the manufacture of crosslinked copolymers from these mixtures.

The use of polyimides of unsaturated dicarboxylic acids, such as, for example, polymaleimides, for the manufacture of polyaddition products and polymerisation products, is known. Thus, for example, French Pat. No. 1,555,564 describes the polyaddition of N,N'-bis-maleimides with primary diamines and the curing of these intermediate adducts by thermal polymerisation. However, the polymers obtained are unsatisfactory for many applications, since they have a relatively low resistance to heat distortion.

Whilst the polymers obtained by thermal homopolymerisation of bis-maleimides have better resistance to heat distortion than the polymers manufactured according to French Pat. No.1,555,564, they suffer from the disadvantage that the mechanical properties, especially the flexural impact strength, of these products, are poorer. Furthermore, the polymerisation products obtained from bis-maleimides do not exhibit high resistance to heat-aging. On prolonged heat exposure, the products become increasingly more brittle and are finally destroyed.

It is known and described, for example, in "Journal fer praktische Chemie", volume 132, page 39–58 (1931), that indole by itself cannot be polymerised to give a macromolecular product.

"Journal of Macromolecular Science — Chem., A7(6), pp. 1265-1278 (1973)" describes the copolymerisation of maleic anhydride with indole. This does not give cross-linked polymers, but products which are soluble in dilute alkalis.

It has now been found that mixtures of polyimides of unsaturated dicarboxylic acids and indole and/or indole derivatives can be cured to give crosslinked copolymers which do not exhibit the abovementioned drawbacks or exhibit them to a greatly reduced degree. The new copolymers combine good mechanical properties with relatively higher resistance to heat distortion. In particular, the new copolymers are distinguished by greater resistance to heat-aging.

Accordingly, the present invention relates to new, curable mixtures which are characterised in that they contain a. polyimides which, per molecule, contain at least two radicals of the general formula I

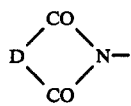
(I)

in which D denotes a divalent radical containing a carbon-carbon double bond, b. indole and/or indole derivatives of the general formula II

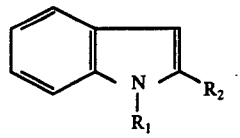
(II)

in which $R_1$ denotes a hydrogen atoms, an alkyl group with 1-4 C atoms or an acyl group with 2-5 C atoms and $R_2$ denotes a hydrogen atom or an alkyl group with 1-4 C atoms, and optionally c. catalysts.

Preferably, the mixtures according to the invention contain, as polyamides (a), compounds of the formula III

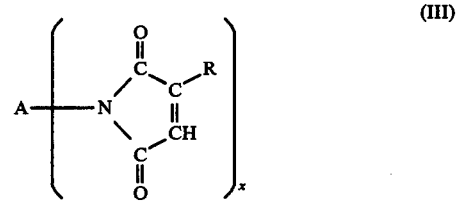
(III)

in which A denotes a x-valent organic radical with 2 to 30 C atoms, R denotes a hydrogen atom or the methyl group and x denotes the number 2 to 3.

The symbol A in the formula III can denote a linear or branched alkylene radical with fewer than 20 carbon atoms, a phenylene radical, a cyclohexylene radical or a radical of the formula

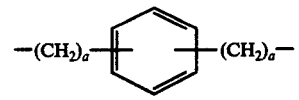

in which $a$ represents an integer from 1 to 3.

The symbol A can also comprise several phenylene or cyclohexylene radicals which are linked directly or by a single valency bond or by an atom or an inert group, such as, for example, oxygen or sulphur atoms or alkylene groups with 1 to 3 carbon atoms, or via the following groups: —CO—, —SO₂—, —NR— (R=Alkyl), —N=N—, —CONH—, —COO—, —CONH—A—NHCO—, O=P(O—)₃ and S=P(O—)₃.

In addition, the various phenylene or cyclohexylene radicals can be substituted by methyl groups. The symbol A can also represent the grouping

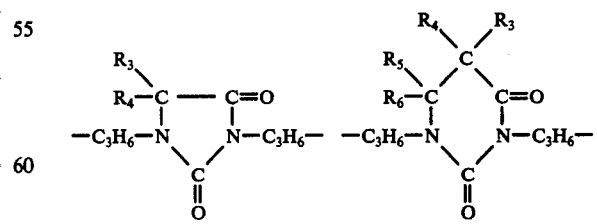

Herein, $R_3$, $R_4$, $R_5$ and $R_6$ denote hydrogen atoms or identical or different aliphatic hydrocarbon radicals with 1-6 carbon atoms, and $R_3$ and $R_4$ together with the carbon atoms in position 5 can also form a 5-membered or 6-membered aliphatic ring.

In a particular embodiment, the curable mixtures contain polyamides of the formula III, wherein A denotes a radical of the formulae

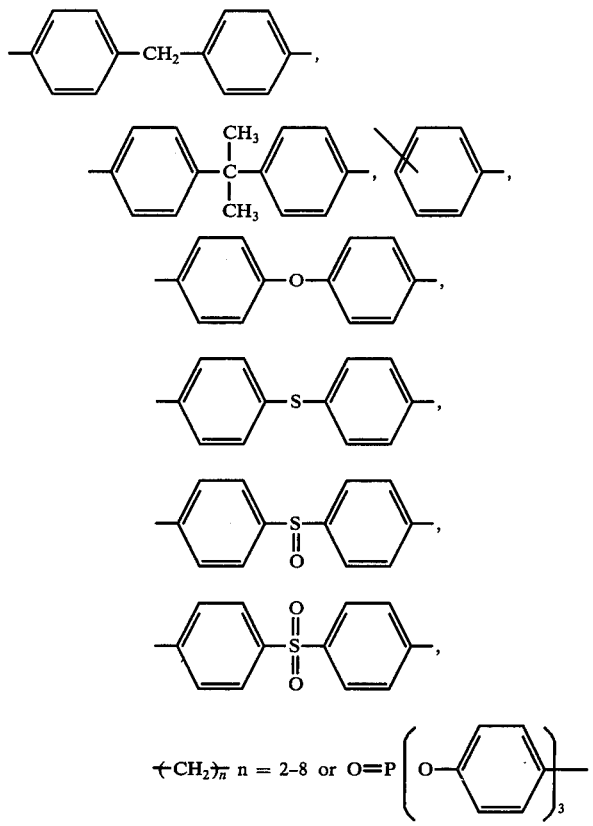

and R denotes a hydrogen atom.

Polyimides which contain radicals of the formula I, are a known category of compounds and can be manufactured by using the methods described in U.S. Pat. No. 3,010,290 and in British Pat. Specification No. 1,137,592, by reacting the corresponding polyamines with the unsaturated dicarboxylic acid anhydrides in a polar solvent and in the presence of a catalyst. Polyimides containing phosphorus, and their manufacture, are also described in Belgian Pat. No. 806,071.

The following may be mentioned as specific examples of polyimides which may be present in the mixtures according to the invention: N,N'-ethylene-bis-maleimide, N,N'-hexamethylene-bis-maleimide, N,N'-m-phenylene-bis-maleimide, N,N'-p-phenylene-bis-maleimide, N,N,'-4,4'-diphenylmethane-bis-maleimide, N,N'-4,4'-3,3'-dichloro-diphenylmethane-bis-maleimide, N,N'-4,4'-diphenyl ether bis-maleimide, N,N'-4,4'-diphenylsulphone-bis-maleimide, N,N'-4,4'-dicyclohexylmethane-bis-maleimide, N,N'-α,α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phenylene-bis-citraconimide, N,N'-4,4'-diphenylmethane-bis-citraconimide, N,N'-4,4'-2,2-diphenylpropane-bis-maleimide, N,N'-γ,γ'-1,3-dipropylene-5,5-dimethyl-hydantoin-bis-maleimide, N,N'-4,4'-diphenylmethane-bis-itaconimide, N,N'-p-phenylene-bis-itaconimide, N,N'-4,4'-diphenylmethane-bis-dimethylmaleimide, N,N'-4,4'2,2-diphenylpropane-bis-dimethylmaleimide, N,N'-hexamethylene-bis-dimethylmaleimide, N,N'-4,4'-diphenyl ether bis-dimethylmaleimide, N,N'-4,4'-diphenylsulphone-bis-dimethylmaleimide, the N,N'-bis-maleimide of 4,4'-diamino-triphenyl phosphate, the N,N'-bis-maleimide of 4,4'-diamino-triphenyl phosphite, the N,N'-bis-maleimide of 4,4'-diamino-triphenyl thiophosphate, the N,N',N''-tris-maleimide of tris-(4-aminophenyl) phosphate, the N,N',N''-tris-maleimide of tris-(4-aminophenyl) phosphite and the N,N',N''-tris-maleimide of tris-(4-aminophenyl) thiophosphate. It is also possible to use mixtures to two or more of these polyimides.

Indoles and indole derivatives of the general formula II are known compounds. Preferably, the mixtures according to the invention contain compounds of the formula II, wherein $R_1$ denotes a hydrogen atom or an alkyl group with 1–4 C atoms and $R_2$ denotes a hydrogen atom.

In a particular embodiment, the curable mixtures contain indole or N-methylindole.

The mixtures according to the invention contain polyimides and indole or indole derivatives in a ratio such as to provide 0.005 to 1.0 mol, preferably 0.1 to 0.8 mol, of indole or indole derivative per 1 equivalent of imide group. The curable mixture can also consist of several different polyimides and indole and/or several indole derivatives.

The curing of the mixtures according to the invention to give insoluble, crosslinked copolymerisation products is carried out by warming the mixtures, which optionally contain catalysts, to temperatures of up to 300° C, preferably at temperatures of between 25° and 260° C, depending on whether the polymerisation reaction is being carried out in the melt or in solvents or in the presence of catalysts.

Where curing is carried out in the melt, temperatures of 100° to 260° C are particularly suitable, the curing advantageously being started at temperatures below 180° C. In solution, on the other hand, lower temperatures of, for example, 25° to 150° C can also be used.

The following substances may be listed as examples of suitable solvents: aromatics, such as xylene and toluene; halogenohydrocarbons, such as trichloroethylene, tetrachloroethane, tetrachloroethylene and chlorobenzene; ethers, such as dioxane, tetrahydrofurane and dibutyl ether; dimethylformamide, tetramethylurea, dimethylsulphoxide and N-methyl-pyrrolidone.

In some cases, especially when curing mixtures of substances of relatively low reactivity or carrying out the polymerisation in solution at low temperatures, it is appropriate to accelerate the reaction by means of catalysts. Suitable catalysts are radical-forming agents, Friedel-Crafts catalysts and basic catalysts, especially primary, secondary and tertiary amines and quaternary ammonium compounds. The following may be mentioned as suitable amines: diethylamine, tributylamine, triethylamine, triamylamine, benzylamine, N-methylpyrrolidine, tetramethyldiaminodiphenylmethane, quinoline, N,N-diisobutylaminoacetonitrile, N,N-dibutylaminoacetonitrile, imidazole, benzimidazole and their homologues. Benzyltrimethylammonium hydroxide and benzyltrimethylammonium methoxide should be mentioned as examples of suitable quaternary ammonium compounds. Alkali metal alcoholates and alkali metal hydroxides are also very suitable.

The catalysts should be present in the reaction mixture at a concentration of 0.001 to 15% by weight, preferably of 0.01 to 13% by weight, the % by weight data relating to the total amount of the reacting starting components.

It is also possible first to manufacture a prepolymer from the mixtures according to the invention by heating the homogeneously mixed and, if appropriate, finely ground starting materials progressively to 50°-150° C, so that a partially soluble product which is still thermally mouldable, is produced. If necessary, this prepolymer must again be ground to give a processable powder. The prepolymerisation can also be carried out by heating a solution or suspension of the starting materials. For this purpose it is possible to use substances which do not react with the starting materials and which, if desired, dissolve them to a sufficient degree. Examples of such liquids are the organic solvents already mentioned above.

It is furthermore possible to manufacture a prepolymer by first adding very much less than the equivalent amount of one of the two reactants and producing a sufficiently soluble prepolymer, which is still fusible, by heating the mixture, thus produced, to 50°-150° C. This product can subsequently be cured finally, in the final processing, after adding the lacking amount of the component which initially is present in less than equivalent amount.

The curable mixtures according to the invention are above all employed in the field of surface protection, the electrical industry, laminating processes and the building trade. They can be used, in a formulation suited in each case to the particular application, in the unfilled or filled state, and if appropriate in the form of solutions or dispersions, as lacquers, dipping resins, casting resins, injection moulding formulations, impregnating resins, binders and laminating resins.

The invention therefore also relates to a process for the manufacture of crosslinked, insoluble and infusible copolymerisation products, characterised in that polyimides which contain radicals of the general formula I are copolymerised with indole and/or indole derivatives of the general formula II, if appropriate in the presence of catalysts, at temperatures of up to 300° C, preferably at between 25° and 260° C.

The manufacture, according to the invention, of the crosslinked, infusible copolymerisation products is as a rule carried out with simultaneous shaping to give mouldings, sheet-like structures, laminates or adhesive bonds. The additives customary in the technology of curable plastics, such as fillers, plasticisers, pigments, dyestuffs, mould release agents and flameproofing materials can be added to the curable compositions. Fillers which can be used are, for example, glass fibres, mica, quartz powder, kaolin, colloidal silicon dioxide or metal powders whilst calcium stearate, for example, can serve as a mould release agent. The shaping can be effected by the hot-pressing process, by brief rapid heating, in a press, to preferably 170°-250° C under a pressure of 1-200 kp/cm². The mouldings thereby produced already have sufficient mechanical strength, so that the curing can be completed outside the press, in an oven at 200°-280° C.

If a prepolymer is first manufactured from the curable mixtures, this prepolymer, ground to a fine powder, can be used as a surface-protection agent by the fluidised bed sintering process.

A solution or suspension of the prepolymer in a suitable solvent can be used for the manufacture of laminates, by impregnating porous sheet-like structures such as woven fabrics, fibre mats or fibre fleeces, especially glass fibre mats or glass fibre fabrics, with solutions or suspensions, and removing the solvent by a drying process. The further curing is carried out in a press at, preferably, 170°-250° C and 5-200 kp/cm² pressure. It is also possible merely to precure the laminates in the press and post-cure the products thus obtained in an oven at 200°-280° C until optimum performance properties are reached.

EXAMPLE 1

89.5 g (0.25 mol) of N,N'-4,4'-diaminodiphenylmethane-bis-maleimide (hereafter referred to as "bis-imide I") and 8.8 g (0.075 mol) of indole are fused together at about 180° C oil bath temperature and degassed by applying a slight vacuum, about 60–100 mm Hg.

1.5 g (1.5% by weight) of benzimidazole is added, as the catalyst, to this clear melt, the mixture is stirred briefly so that the catalyst dissolves, and the melt is poured into moulds of size 150 × 150 × 4 mm. The curable mass is cured first for about 2 hours at 180° C and then for 8 hours at 205° C.

The mouldings thus obtained were tested for their mechanical properties and their resistance to heat distortion.

| | |
|---|---|
| Flexural strength (according to VSM* 77,103) | = 8.2 kg/mm² |
| Flexural impact strength (according to VSM 77,105) | = 5.8 cm kg/cm² |
| Heat distortion point (according to ISO/R** 75) | = 300° C |

*VSM = = Standard specifications of the Verein Schweizerischer Maschinenindustrieller (Federation of the Swiss Engineering Industry)
**ISO/R = Standard specifications of the International Standard Organization/-Recommendation

EXAMPLES 2-13

Mouldings were produced analogously to Example 1 from the mixtures indicated in Table 1 which follows, and were tested for their mechanical properties and their resistance to heat distortion.

Table 1

Composition of curable mixtures and properties of the mouldings produced therefrom

| Example | Composition of the curable mixture | | Flexural strength according to VSM 77,103 (kg/mm²) | Flexural impact strength according to VSM 77,105 (cmkg/cm²) | Heat distortion point according to ISO/R 75 (° C) |
|---|---|---|---|---|---|
| 2 | 89.5 g<br>17.6 g<br>1.5 g | (0.25 mol) "bis-imide I"<br>(0.15 mol) indole<br>(1.46% by weight) benzimidazole | 8.2 | 6.4 | 284 |
| 3 | 71.6 g<br>28.1 g<br>1.2 g | (0.2 mol) "bis-imide I"<br>(0.24 mol) indole<br>(1.2% by weight) benzimidazole | 9.1 | 7.7 | 236 |
| 4 | 89.5 g<br>14.6 g<br>1.5 g | (0.25 mol) "bis-imide I"<br>(0.125 mol) indole<br>(1.44% by weight) benzimidazole | 8.5 | 5.1 | 290 |

Table 1-continued
Composition of curable mixtures and properties of the mouldings produced therefrom

| Example | Composition of the curable mixture | | Flexural strength according to VSM 77,103 (kg/mm$^2$) | Flexural impact strength according to VSM 77,105 (cmkg/cm$^2$) | Heat distortion point according to ISO/R 75 (° C) |
|---|---|---|---|---|---|
| 5 | 89.5 g<br>14.6 g<br>1.05 g | (0.25 mol) "bis-imide I"<br>(0.125 mol) indole<br>(1% by weight) 3-amino-1,2,4-triazole | 7.7 | 4.8 | >300 |
| 6 | 89.5 g<br>14.6 g<br>0.7 g | (0.25 mol) "bis-imide I"<br>(0.125 mol) indole<br>(0.67% by weight) sodium methylate | 4.9 | 1.8 | >295 |
| 7 | 89.5 g<br>14.6 g<br>3.17 g | (0.25 mol) "bis-imide I"<br>(0.125 mol) indole<br>(3.04% by weight) 4,4'-methylene-bis-(n-dimethylaniline) | 6.8 | 4.0 | >300 |
| 8 | 89.5 g<br>14.6 g<br>2.47 g | (0.25 mol) "bis-imide I"<br>(0.125 mol) indole<br>(2.37% by weight) 4,4'-methylene-bis-aniline | 8.7 | 3.9 | 300 |
| 9 | 89.5 g<br>14.6 g<br>9.9 g | (0.25 mol) "bis-imide I"<br>(0.125 mol) indole<br>(9.5% by weight) 4,4'-methylene-bis-aniline | 8.3 | 8.3 | 254 |
| 10 | 72.0 g<br>11.7 g<br>1.2 g | (0.2 mol) N,N'-4,4'-diaminodiphenyl ether bis-maleimide<br>(0.1 mol) indole<br>(1.4% by weight) benzimidazole | 6.2 | 5.3 | — |
| 11 | 75.2 g<br>11.7 g<br>1.2 g<br>59.5 g | (0.2 mol) N,N'-4,4'-diaminodiphenyl thioether bis-maleimide<br>(0.1 mol) indole<br>(1.37% by weight) benzimidazole<br>(0.1 mol) of the N,N',N''-trismaleimide of tris-(4-aminophenyl) phosphate | 6.7 | 4.8 | — |
| 12 | 8.77 g<br>1.2 g<br>89.5 g | (0.075 mol) indole<br>(1.75% by weight) benzimidazole<br>(0.25 mol) "bis-imide I" | 5.7 | 2.8 | — |
| 13 | 16.4 g<br>1.2 g | (0.125 mol) N-methylindole<br>(1.13% by weight) benzimidazole | 7.1 | 4.6 | — |

EXAMPLES 14 and 15

Mouldings are produced according to Example 1 from 1 mol of "bis-imide I" and 0.4 mol of indole (Example 14) or 0.5 mol of indole (Example 15) in the presence of 0.05 mol of benzimidazole as the catalyst, and their mechanical properties are tested.

Table 2

| Properties of the mouldings | Example 14 | Example 15 |
|---|---|---|
| Flexural strength (according to VSM 77,103) | 9.8 kg/mm$^2$ | 10.2 kg/mm$^2$ |
| Flexural impact strength (according to VSM 77,105 | 8.1 cm kg/cm$^2$ | 7.3 cm kg/cm$^2$ |
| Cold water absorption | 1.43 % | 1.34 % |
| Heat distortion point (according to ISO/R 75) | 285° C | >300° C |

COMPARISON EXAMPLE

For comparison, mouldings are produced by polymerisation of "bis-imide I" by itself, the "bis-imide I" being subjected to thermal homopolymerisation for 10 hours. The mouldings produced in this way exhibit the following mechanical properties:

Flexural strength (according to VSM 77,103) = 4.1 kg/mm$^2$

Flexural impact strength (according to VSM 77,105) = 1.0 cm kg/cm$^2$

Cold water absorption = 0.87%

Heat distortion point (according to ISO/R 75) = 260° C

Thereafter, the mouldings produced according to Example 14 and 15 and according to the Comparison Example are heated to 270° C for 10 days. Whilst the mouldings produced from the mixtures according to the invention show no signs of destruction after a heat exposure of 10 days at 270° C, the mouldings produced from "bis-imide I" by itself show signs of destruction after only 3 days heat exposure at 270° C and are completely destroyed after 10 days heat expsoure.

EXAMPLE 16

Mouldings are produced analogously to Example 1 from 1 mol of "bis-imide I" and 0.5 mol of indole in the presence of 0.1 mol of 4,4'-diaminodiphenylmethane as the catalyst, and their mechanical properties are tested. The mouldings are then subjected to a heat exposure of 10 days at 270° C and the mechanical properties of the mouldings are again determined.

| | 0 | 3 | 10 days/270° |
|---|---|---|---|
| Flexural strength according to VSM 77,103 (kg/mm$^2$) | 11.1 | 11.6 | 13.1 |
| Flexural impact strength according to VSM 77,105 (cm kg/cm$^2$) | 7.9 | 9.9 | 10.9 |
| Cold water absorption (%) | 1.02 | 2.63 | 2.94 |
| Weight loss (%) | — | 1.33 | 1.91 |
| Heat distortion point according to ISO/R 75 (° C) | 267° | >300° | >300° |

COMPARISON EXAMPLE

Mouldings are produced analogously to the process described in Example 1, by reaction of 1 mol of "bis-imide" with 0.4 mol of 4,4'-diaminodiphenylmethane, and are tested for their mechanical properties. The mouldings are then subjected to a heat exposure of 10 days at 270° C and the mechanical properties of the mouldings are again determined.

| | 0 | 3 | 10 days/270° C |
|---|---|---|---|
| Flexural strength according to VSM 77,103 (kg/mm$^2$) | 14.7 | 12.6 | 12.1 |
| Flexural impact strength according to VSM 77,105 (cm kg/cm$^2$) | 11.6 | 9.2 | 11.6 |
| Cold water absorption (%) | 0.75 | 2.99 | 3.17 |
| Weight loss (%) | — | 1.23 | 2.73 |
| Heat distortion point according to ISO/R 75 (° C) | 229° | >300° | >300° |

The comparison shows that the mouldings produced from the mixtures according to the invention in particular exhibit a lower weight loss after heat exposure and hence the stability of shape, and accuracy of dimension, of these mouldings is more certain.

EXAMPLES 17 and 18

Mouldings were produced analogously to Example 1 from 1 mol of "bis-imide I" and 0.3 mol of indole (Example 17) or 1.4 mols of indole (Example 18) in the presence of 0.05 mol of benzimidazole as the catalyst, and their mechanical properties were tested.

| Properties of the mouldings | Example 17 | Example 18 |
|---|---|---|
| Flexural strength (according to VSM 77,103) | 8.2 kg/mm$^2$ | 9.8 kg/mm$^2$ |
| Flexural impact strength (according to VSM 77,105) | 5.8 cm kg/cm$^2$ | 10.3 cm kg/mm$^2$ |
| Heat distrotion point (according to ISO/R 75) | >300° C | 210° C |

What is claimed is:

1. A curable composition of matter which comprises
a. polyimides of the formula III

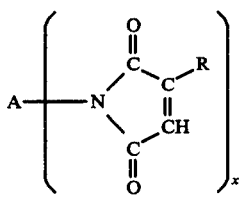

(III)

in which A denotes a x-valent organic radical with 2 to 30 carbon atoms, R denotes hydrogen or methyl, and x denotes the number 2 or 3;
b. indole or indole derivatives of the general formula II

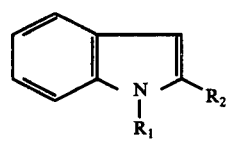

(II)

in which R$_1$ denotes hydrogen, alkyl with 1 to 4 carbon atoms or acyl with 2 to 5 carbon atoms, and R$_2$ denotes hydrogen or alkyl with 1 to 4 carbon atoms; and the ratio of components (a) and (b) being chosen to provide 0.005 to 1.0 mol of indole derivative (b) of formula II per each 1 equivalent of imide group in component (a).

2. A composition according to claim 11 wherein additionally 0.001 to 15% of a curing catalyst is present by weight of the total curable mixture, said catalyst being selected from the group consisting of Friedel-Crafts catalysts and basic catalysts, said basic catalysts being selected from the group consisting of primary, secondary and tertiary amines, quaternary ammonium compounds, alkali metal alcoholates and alkali metal hydroxides.

3. A composition according to claim 1, which comprises as the polyimide, a compound of the formula III in which A denotes a radical selected from of the formulae consisting of

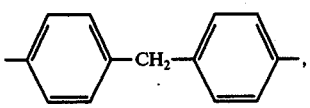

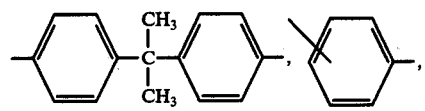

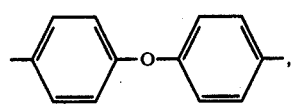

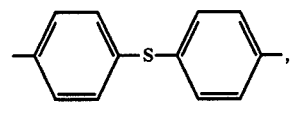

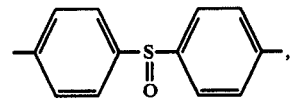

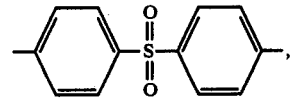

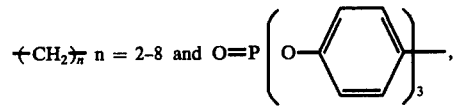

and R denotes a hydrogen atom.

4. A composition according to claim 1, which comprises as the polyimide a compound selected from the group consisting of N,N'-4,4'-diaminodiphenylmethane-bis-maleimide, N,N'-4,4'-diaminodiphenyl ether bis-maleimide, N,N'-4,4'-diaminodiphenyl thioether-bis-maleimide and the N,N',N''-tris-maleimide of tris-(4-aminophenyl) phosphate.

5. A composition according to claim 1 which comprises compounds of formula II, wherein R$_1$ denotes hydrogen or alkyl with 1 to 4 carbon atoms and R$_2$ denotes hydrogen.

6. A composition according to claim 5, which comprises indole or N-methylindole as compounds of the formula II.

7. A composition according to claim 1, which comprises polyimides (a) and indole or indole derivatives (b) in a ratio such as to provide 0.1 to 0.8 mol of indole derivative of the formula II per 1 equivalent of imide group.

8. A composition according to claim 2, wherein additionally 0.01 to 13% of a curing catalyst is present by weight of the total curable mixture.

9. A composition according to claim 2, which comprises as curing catalyst a basic catalyst.

10. A process for the manufacture of insoluble cross-linked copolymerization products from a curable composition according to claim 1, said process comprising reacting (a) polyimides of the formula III

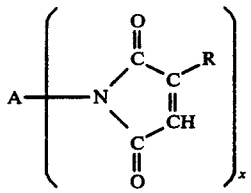

(III)

in which A denotes a $x$-valent organic radical with 2 to 30 carbon atoms, R denotes hydrogen or methyl, and $x$ denotes the number 2 or 3, and (b) indole or indole derivatives of the general formula II

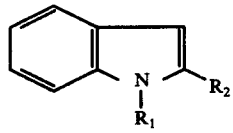

(II)

in which $R_1$ denotes hydrogen, alkyl with 1 to 4 carbon atoms or acyl with 2 to 5 carbon atoms, and $R_2$ denotes hydrogen or alkyl with 1 to 4 carbon atoms, where the ratio of components (a) and (b) are chosen to provide 0.005 to 1.0 mol of indole derivative of formula II per each 1 equivalent of imide group in component (a), in the presence of a curing catalyst at a temperature between 25° and 260° C.

* * * * *